United States Patent Office 3,541,668
Patented Nov. 24, 1970

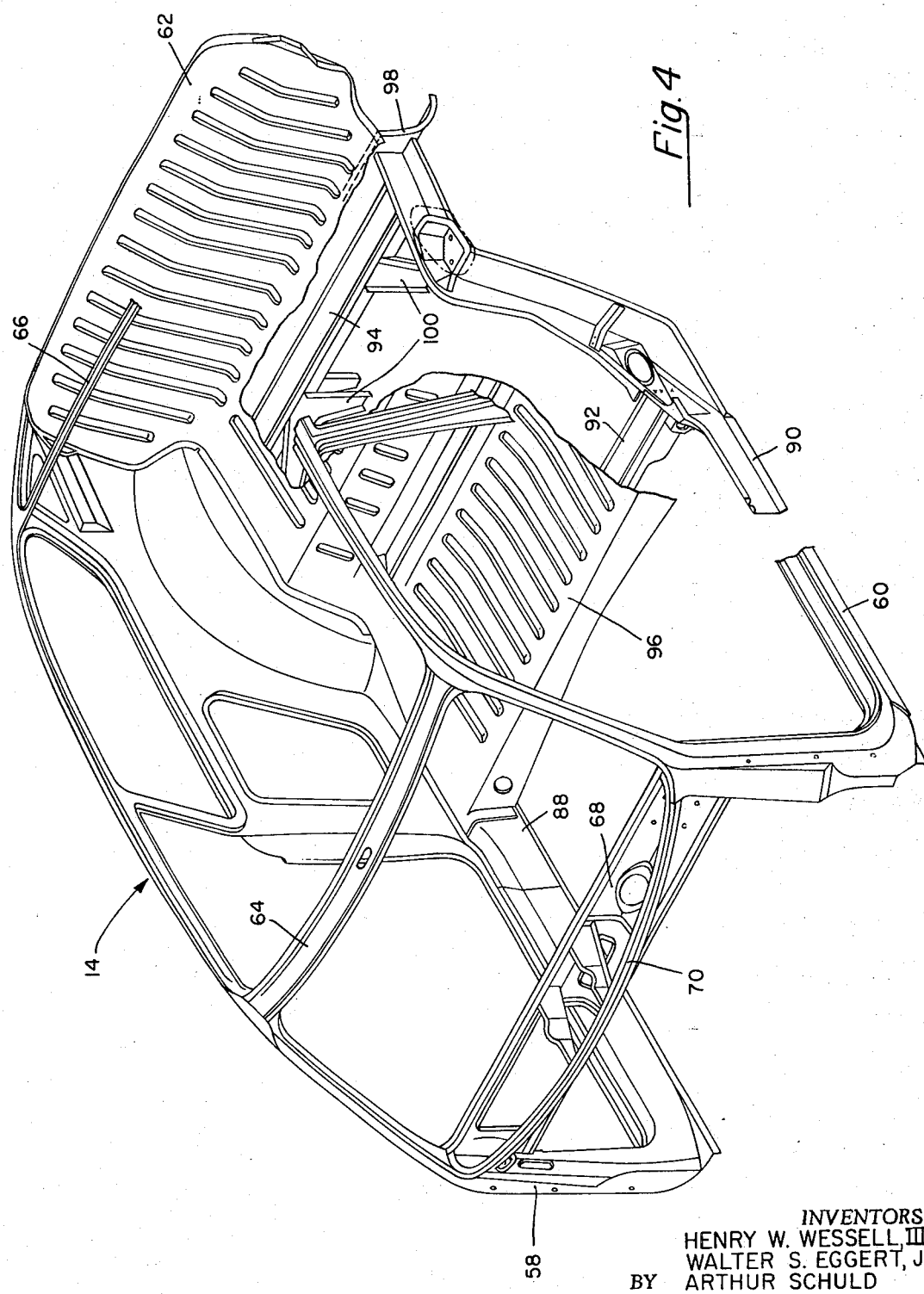

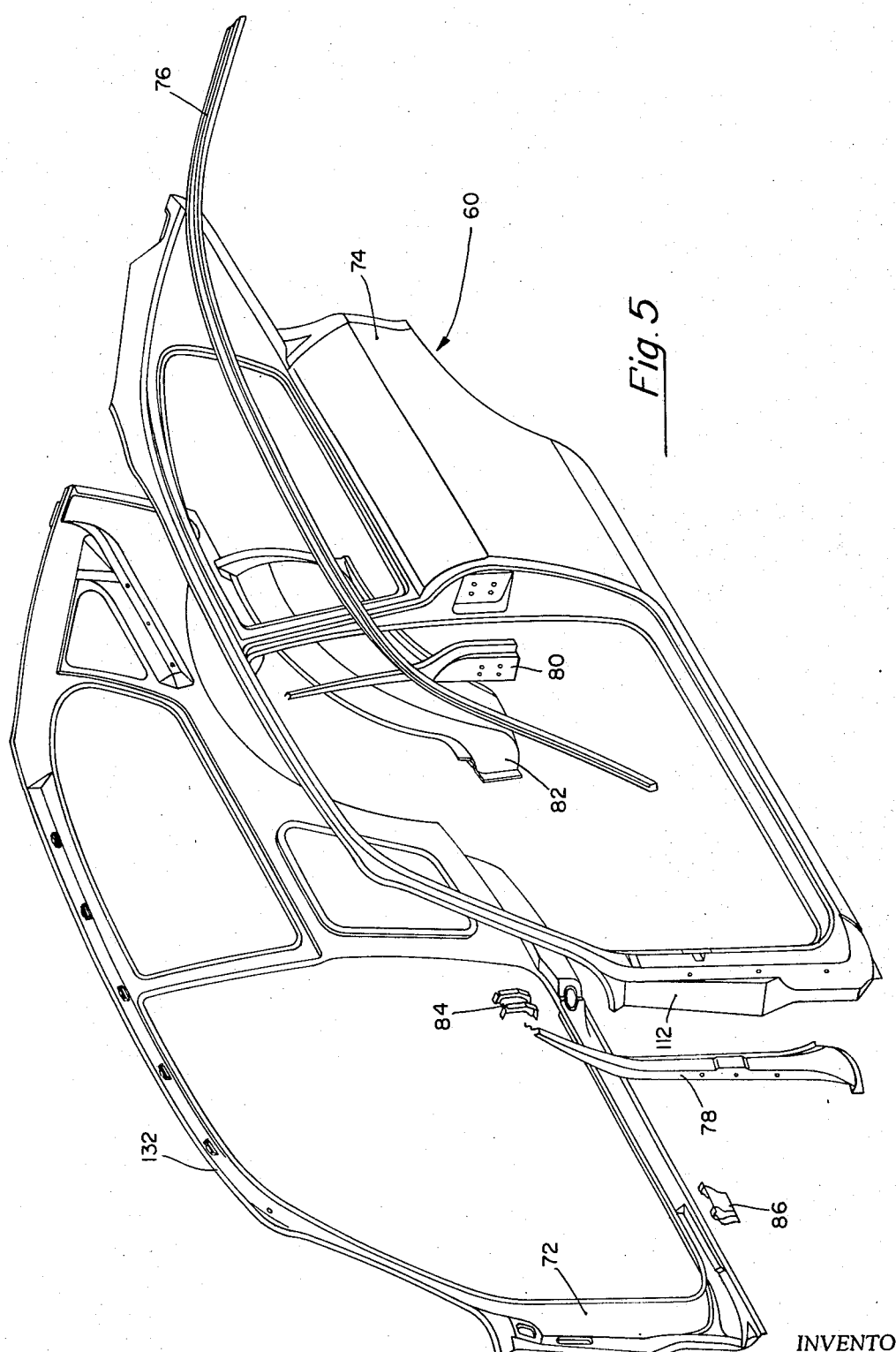

3,541,668
METHOD OF ASSEMBLING A UNITIZED VEHICLE BODY
Henry W. Wessells III, Paoli, and Walter S. Eggert, Jr., Huntingdon Valley, Pa., and Arthur Schuld, Wolfsburg, Hannover, Germany; said Wessells and said Eggert assignors to the Budd Company, Philadelphia, Pa., a corporation of Pennsylvania, and said Schuld assignor to Volkswagenwerk Aktiengesellschaft, Wolfsburg, Hannover, Germany, a corporation of Germany
Filed Dec. 1, 1967, Ser. No. 687,300
Int. Cl. B23p 21/00
U.S. Cl. 29—469
4 Claims

ABSTRACT OF THE DISCLOSURE

A method of assembling a unitized body consisting of fabricating the major sub-assemblies such as the roof, floor pan, rear balloon and front end. The sub-assemblies are provided with adjacent internal flanges for positioning about a central welding buck and being joined by spot welding along the flanges. The buck is then removed and the body completed by positioning and securing the center floor pan sub-assembly in the body.

---

This invention relates to a unitized vehicle body construction and more particularly to a method of assembling a unitized vehicle body.

A common practice in assembling a unitized vehicle body structure is to assemble the various sub-assembly components as the line progresses, beginning with the floor pan sub-assembly. To the floor pan sub-assembly the side assemblies, rear deck components and forward components are attached with the roof structure being the last unit secured to complete the unitized body structure.

The major object of this invention is to provide a new method of assembly, utilizing novel panels and assemblies which have internal attachment flanges or exposed joints for spot welding or arc welding so that the body structure may be assembled without the addition of filler plates as is the common practice.

Another objcet of this invention is to provide a body structure susceptible to the method of assembly technique which permis major welding from outside the body structure by using a backup buck positioned inside the structure for welding the sub-assemblies together by electrodes moving into contact from the outside.

A further object of this invention is to provide a method of body structure assembly in which the last unit welded into the assembly is the center floor pan.

These and other objects of this invention will become more apparent as reference is made to the accompanying specification and drawings in which:

FIG. 4 is the view of the rear balloon subassembly shown in FIG. 2 with portions broken away to illustrate details of the rear underbody assembly;

FIG. 5 is an exploded view of the left uniside of the of the rear balloon subassembly.

Figure 1:
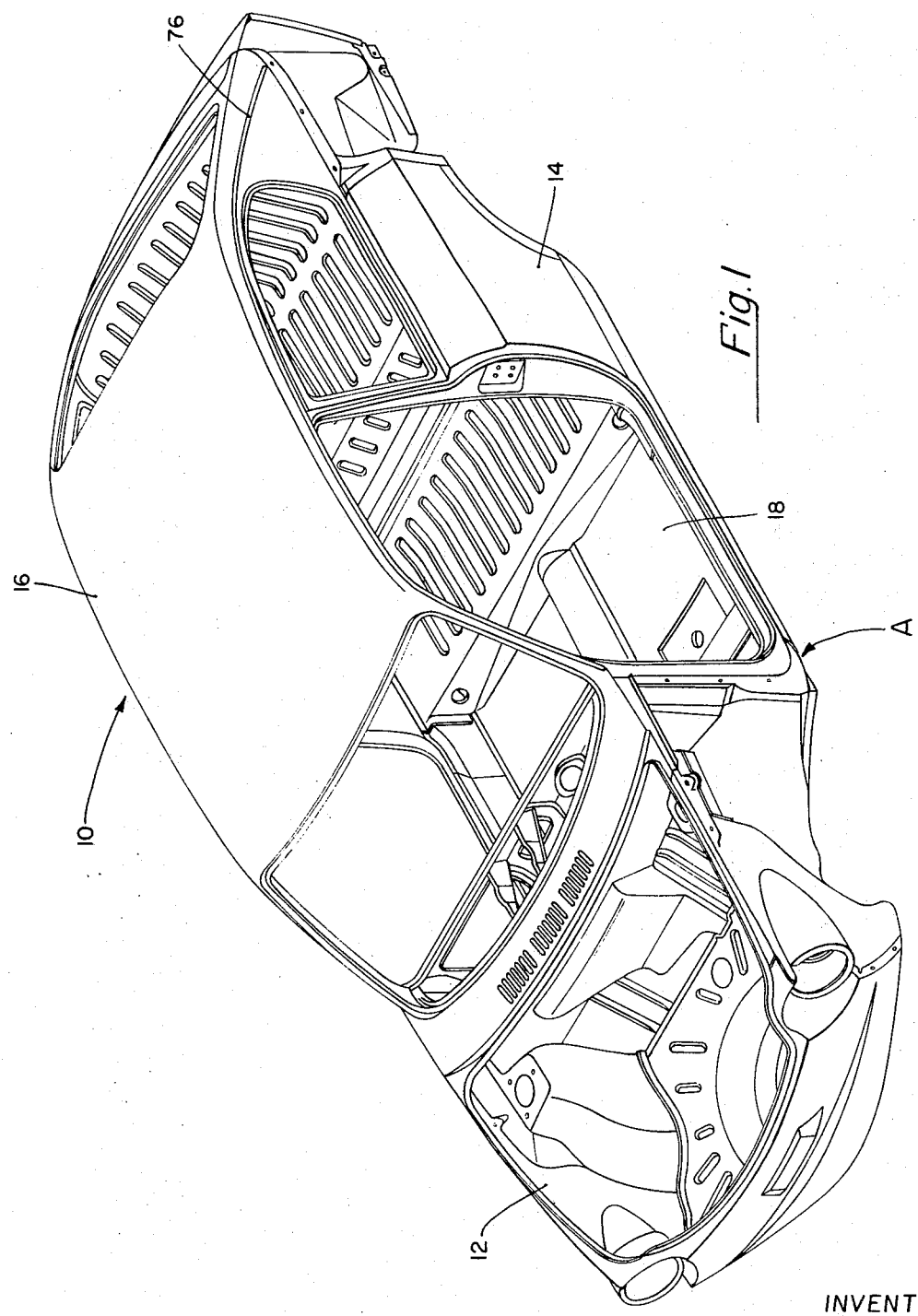
FIG. 1 is a three-quarter front perspective of the assembled body structure.
Figure 2:
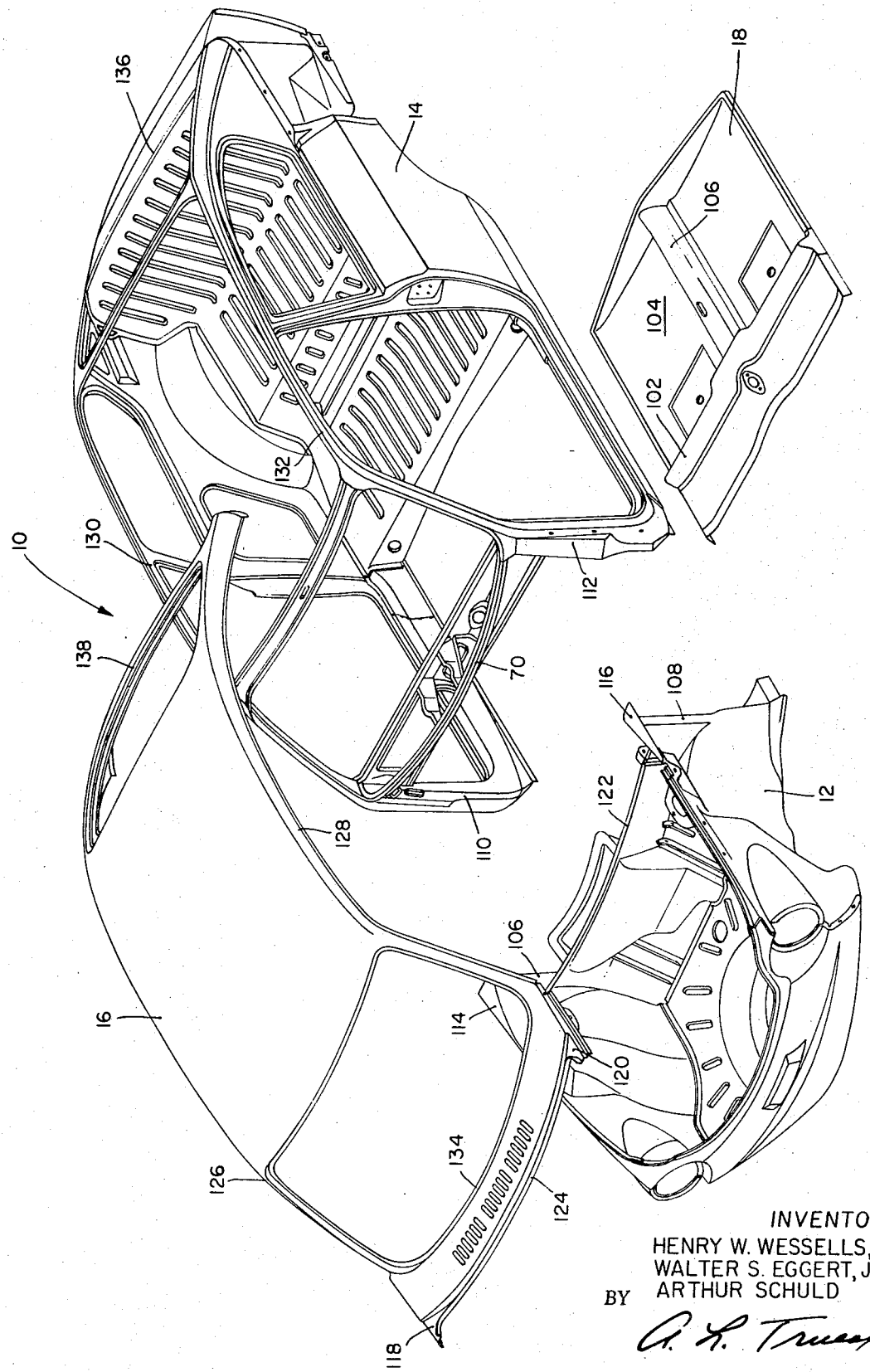
FIG. 2 is an exploded three-quarter perspective view of the major subassembly body components prior to assembly.

Referring now to the drawings, as best seen in FIG. 1 and FIG. 2, the major subassemblies of the unitized body, indicated generally by a numeral 10, includes a front-end subassembly 12, a rear balloon subassembly 14, a roof subassembly 16, and a center floor pan subassembly 18.

Throughout this specification the methods of securing various components will be welding technique such as spot or arc welding.

Figure 3:
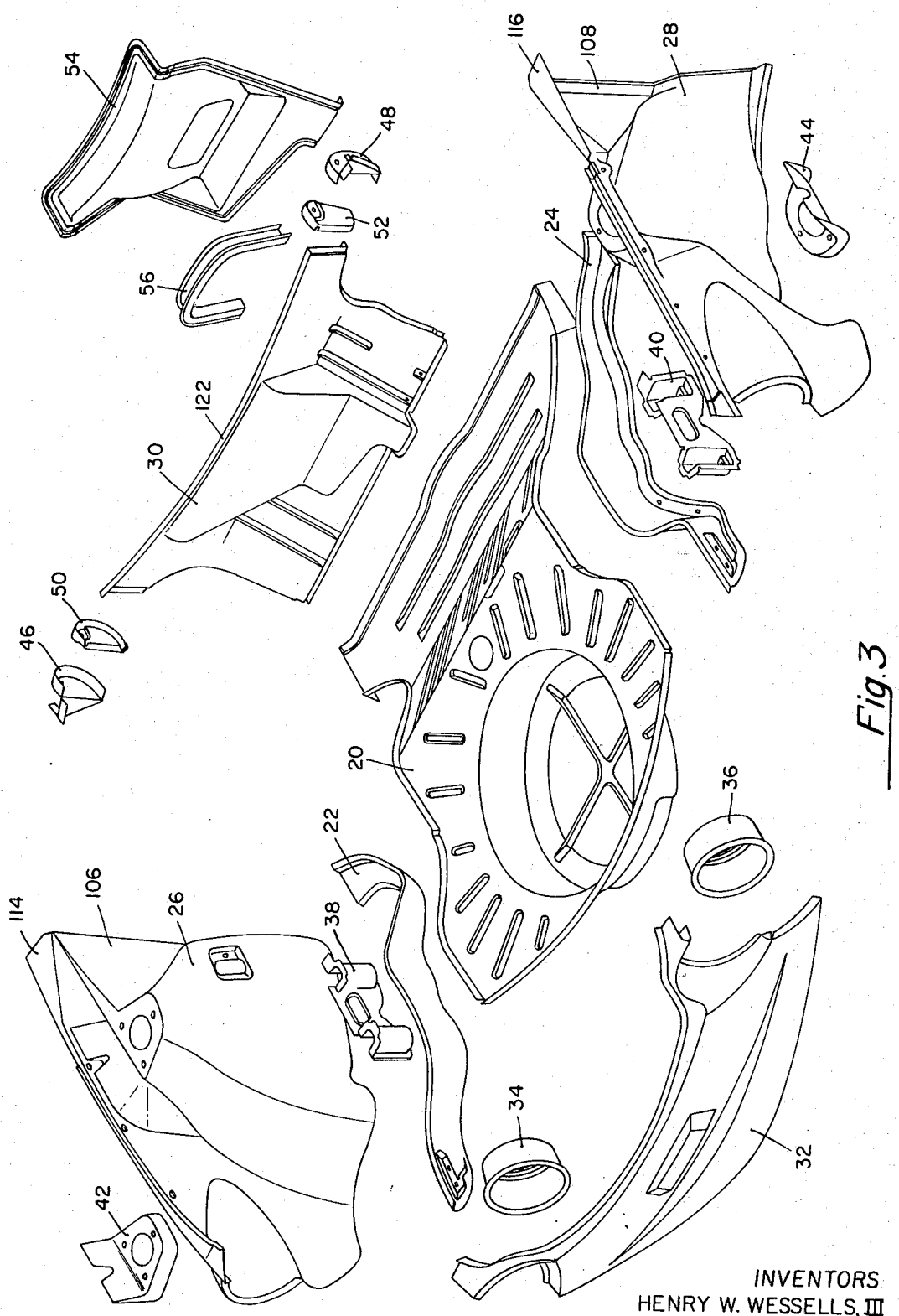
FIG. 3 is an exploded view of the parts of the front and subassembly shown in FIG. 2.

The front-end subassembly 12, best seen in FIG. 3, includes a front floor pan 20, right and left front side sills 22, 24, right and left luggage compartment side panels or front wheel housings 26, 28, dash panel 30, front lower panel 32, and right and left head-lamp housings 34, 36.

Prior to assembling the components of the front-end sub-assembly, shown in FIG. 3, to complete the subassembly 12, various reinforcing parts are secured thereto The front sill reinforcements 38, 40, are positioned and secured to their respective right and left front sills 22, 24, and the front shock absorber reinforcing 42, 44, are secured to their respective left and right front wheel housings 26, 28. The right and left outer 46, 48, and inner 50, 52, luggage compartment hinges are secured to the dash panel 30. The cowl air intake plenum 54 and plenum chamber baffle 56 are also secured to the dash panel 30 prior to assembly in the front-end subassembly.

To assemble the front-end subassembly, the front sills 22, 24 are secured to the front floor pan 20. Then the luggage compartment panels 26, 28 are secured to the assembled floor pan and front sills. The dash panel 30 is then secured to the rear of the front floor pan 20 and side wheel house panels 26, 28 and the front lower panel 32 is secured to the front to complete the open box structure. To complete the front-end subassembly, the headlamp housings 34, 36 are secured to the respective right and left front wheel house panels 26, 28, and the respective right and left sides of the front lower panel 32.

The rear balloon subassembly 14, best seen in FIGS. 2 and 4, includes right and left unisides 58, 60, rear underbody assembly 62, windshield header reinforcement 64, rear header reinforcement 66, instrument panel 68, and lower windshield support 70.

Prior to assembling the components of the rear balloon subassembly, various reinforcements and parts are assembled to complete the components.

Since the right and left unisides 58, 60, are identical but opposites only the left uniside 60 is illustrated in FIG. 5 for an explanation of its components and assembly thereof. The left uniside 60 includes an inner stamping 72, an outer stamping 74, roof drip moulding 76, body hinge reinforcement 78, body door lock reinforcement 80, rear wheel housing extension 82, jack pad bracket 84, and an inner cross-member reinforcement 86. The body hinge reinforcement 78 and body door lock reinforcement 80 are secured to the outer stamping 74 and the rear wheel housing extension 82, jack pad bracket 84, and inner cross-member reinforcement 86 are secured to the inner stamping 72 and then the outer 74 and inner 72 stampings are joined and the roof drip moulding secured thereto to form the left uniside 60.

The rear underbody 62, as best seen in FIG. 4, includes a right and left Z shaped rear sills 88, 90 reinforced at the high stress points by doubler plates and strengthening braces. The Z shaped sills 88, 90, are joined by front and rear box section cross-members 92, 94 and the rear floor pan 96. An engine shield 98 is secured to the rear floor pan 96 and the rear end of the rear sills 88, 90. Right and left L shaped engine support brackets 100 are secured to the rear cross-member 94 and to the respective rear side sills 88, 90 for attaching an engine (not shown) within the unitized body.

The center floor pan-subassembly 18 as seen in FIG. 2, includes a front cross-member 102 secured to the center floor pan 104 for strengthening the floor pan and providing support for the installation of a front seat. A central tunnel 106 is provided for extension of the vehicle controls from the driver's compartment to the rear mounted engine and rear wheel brakes.

When the subassemblies are joined to complete the unitized body, the rear balloon 14 is secured to the front-end 12 by welding flanges 106, 108 at the rear of the front wheel housings 26, 28 to the exposed inner flanges 110, 112 of the respective right and left unisides 58, 60. The subassemblies are further joined by arc welding the joint formed between the front floor pan 20 and the adjacent lower portion of the respective unisides 58, 60 as indicated at A in FIG. 1.

The roof subassembly is then joined to the front-end 12 by welding the flanges 114, 116 to the opposite sides 118, 120 of the exterior cowl cover and the upper flange 122 at the dash panel 30 to the front flange 124 of the exterior cowl cover.

The edge flanges 126, 128 of the roof assembly are also connected to the exposed flanges 130, 132 of upper edges of each uniside 58, 60 but the roof is not connected to the header reinforcements 64, 66. The lower windshield bar 70 is secured to the windshield flange 134 and the upper flange 136 of the rear floor pan 96 is secured to the flange 138 of the rear window opening.

The center welding buck is then removed and the center floor pan subassembly 18 is secured in place to complete the body. In securing the center floor pan subassembly, a welding flange 140, extending about the periphery of the subassembly, is secured to adjacent flanges at the front-end subassembly 12, and rear balloon subassembly 14.

While but one method of assembly for a unitized vehicle body has been shown and explained, it is obvious modification thereof may be made without departing from the scope of the following claims.

We claim:
1. A method of assembling a unitized vehicle body having a front-end subassembly, a rear balloon subassembly, a roof subassembly, and a center floor pan subassembly, said subassemblies having internal attachment flanges for spot welding and exposed joints for arc welding, said method comprising the steps of:
   (1) positioning a welding backup buck in the center floor pan opening of said rear balloon subassembly,
   (2) positioning said front-end subassembly in contact with said rear balloon subassembly with the internal attachment flanges of each subassembly in joining position, and welding said flanges thereby joining said front-end subassembly to said rear balloon subassembly,
   (3) positioning said roof subassembly in contact with the joined front-end subassembly and rear balloon subassembly with the attachment flanges of said roof subassembly in joining position with the internal attachment flanges of said front-end subassembly and said rear balloon subassembly and welding said flanges thereby joining said roof subassembly, said front-end subassembly and said rear balloon subassembly,
   (4) removing said backup buck from the center floor pan opening,
   (5) positioning said center floor pan subassembly in contact with the joined front-end subassembly and rear balloon subassembly with the internal attachment flanges of the subassemblies in joining position and welding said flanges thereby joining said center floor pan subassembly to complete the unitized body.

2. The method of assembling a unitized vehicle body claimed in claim 1 wherein the preassembling at said front-end subassembly comprises the steps of:
   (1) securing a right and left front sill to a front floor pan by welding means,
   (2) securing a right and a left front wheel housing to the assembled front floor pan and sill by welding means,
   (3) securing a cowl assembly to the rear of said floor pan and said front wheel housings by welding means,
   (4) securing a front lower panel to the front of said floor pan and said front wheel housings by welding means, and
   (5) securing a left and a right headlamp housing in the opening formed by the joined front wheel housings and front lower panel by welding means whereby said front-end subassembly is completed.

3. The method of assembling a unitized vehicle body claimed in claim 1 wherein the preassembling of said rear balloon comprises the steps of:
   (1) assembling the left and right uniside by securing the body hinge reinforcements and body door lock reinforcements to the outer stamping, by securing the rear wheel housings to the inner stamping and by joining the outer and inner stampings and securing the drip molding thereto for completing the respective uniside,
   (2) assembling the rear underbody by connecting the Z shaped rear sills at the front and rear by box sections and securing the rear floor pan thereto,
   (3) assembling the front and rear roof headers between the unisides and attaching the cowl and lower windshield support to the front of the unisides for completing the rear balloon.

4. The method of assembling a unitized vehicle body claimed in claim 1 which further includes in step 2 an arc weld between the rear balloon subassembly and the front subassembly at the front sill of each uniside and lower rear of the front subassembly for further strengthening of the joint.

References Cited
UNITED STATES PATENTS

| | | | |
|---|---|---|---|
| 1,877,653 | 9/1932 | Fageol | 29—430 |
| 2,389,907 | 11/1945 | Helmuth | 29—469 X |
| 2,634,494 | 4/1953 | Powers | 29—469 X |
| 2,773,304 | 12/1956 | Fageol | 29—469 |
| 2,779,092 | 1/1957 | Gordon | 29—430 |
| 3,021,172 | 2/1962 | Fiala et al. | 296—28 |
| 3,022,105 | 2/1962 | Tjoarda | 296—28 |

CHARLIE T. MOON, Primary Examiner

U.S. Cl. X.R.

29—471.1; 296—28